United States Patent [19]
Stevenson

[11] 3,854,348
[45] Dec. 17, 1974

[54] VARIABLE SPEED TRANSMISSION
[76] Inventor: Gerald W. Stevenson, 8007 S. Michigan Ave., Whittier, Calif. 90602
[22] Filed: June 13, 1973
[21] Appl. No.: 369,414

[52] U.S. Cl. .................. 74/774, 74/645, 74/718, 74/731, 74/874
[51] Int. Cl. ...................... F16h 5/18, F16h 39/00
[58] Field of Search ............ 74/774, 874, 865, 877, 74/731, 732, 733, 645, DIG. 1, 718

[56] References Cited
UNITED STATES PATENTS

| | | | |
|---|---|---|---|
| 2,496,042 | 1/1950 | Dikeman | 74/731 X |
| 2,893,267 | 7/1959 | Forster | 74/731 X |
| 2,982,156 | 5/1961 | McGill | 74/645 X |
| 3,351,168 | 11/1967 | Thorpe | 74/774 X |

Primary Examiner—Samuel Scott
Assistant Examiner—Lance W. Chandler
Attorney, Agent, or Firm—William C. Babcock

[57] ABSTRACT

A hydraulic-mechanical transmission that permits any desired relative rotation of the driven shaft relative to the driving shaft to be obtained, including a one to one transmission of power. The transmission includes a driving shaft that rotatably supports a housing in which at least one first circular endless confined space is defined in which a first hydraulic fluid is contained and that is subjected to a pumping action by a number of movable elements.

The driving shaft has a sun gear rigidly secured thereto, which sun gear is in engagement with a number of circumferentially spaced planetary gears. Each planetary gear is rigidly secured to a first shaft that is journaled in the housing, and each first shaft being operatively associated to a pumping element. The pumping elements are actuated when the planetary gears rotate relative to the sun gear.

The planetary gears are in toothed engagement with a ring gear that is rigidly secured to a driven shaft assembly. A number of rotatable valve members are supported in the housing to restrict the flow of the first hydraulic fluid in the first confined space to a desired degree. The greater the degree of such restriction, the more power is required for the pumping elements to move, and consequently, the driving shaft delivers torque to the driven shaft assembly at an increased magnitude. By rotating the valves in an opposite direction, the reverse effect is achieved, and the driving shaft delivers less torque to the driven shaft assembly.

By placing the valves in a completely closed position, a one to one ratio between the rate of rotation of the driving shaft and driven shaft assembly may be obtained. Control of the rotatable valves may be either by manual means or automatically by centrifical means that are responsive to the rate of rotation of the housing, with the mode of control of such rotatable valves being the primary subject matter of the present invention.

11 Claims, 13 Drawing Figures

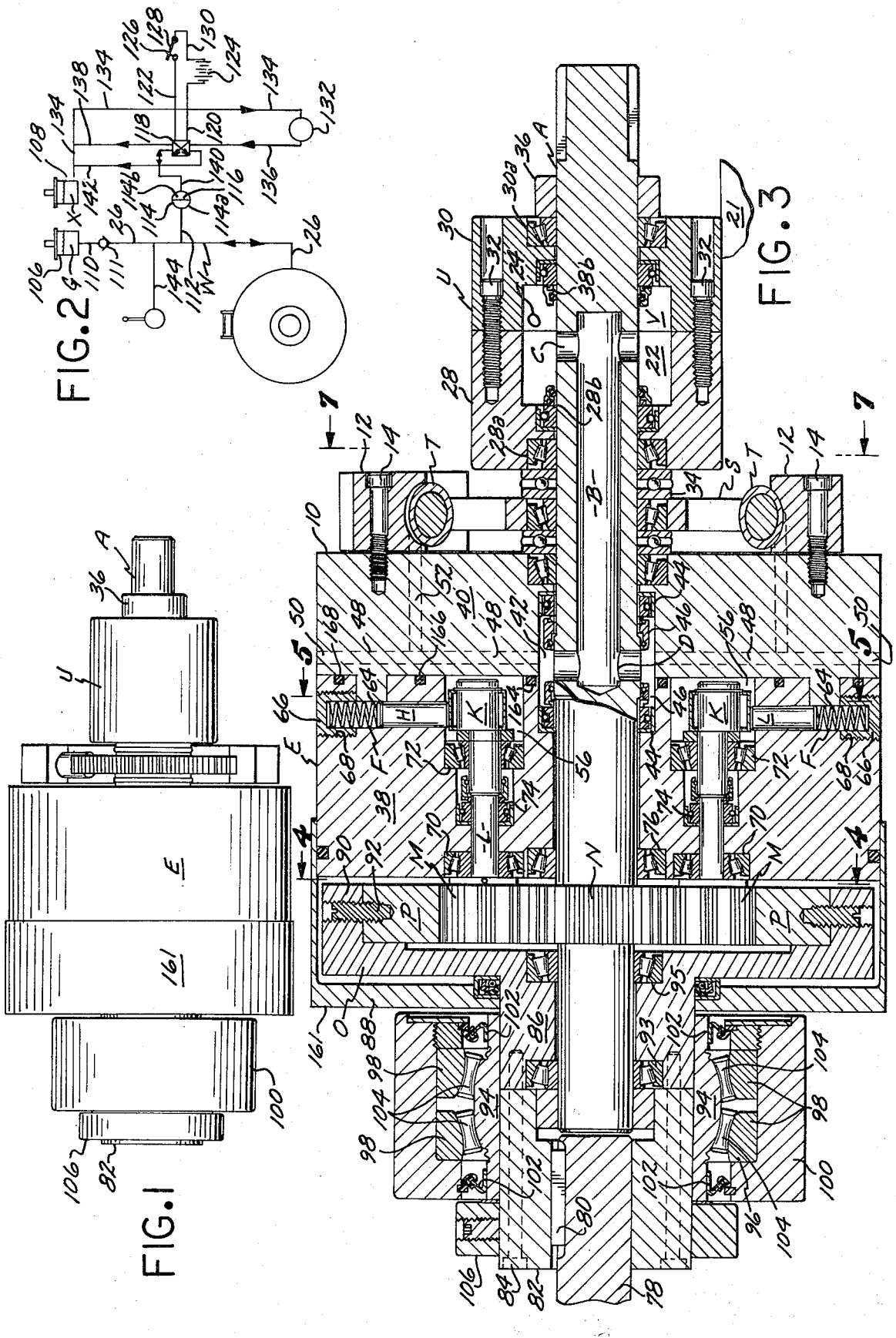

VARIABLE SPEED TRANSMISSION

BACKGROUND OF THE INVENTION

1. Field of the Invention

Improved variable speed transmission.

2. Description of the Prior Art

In my previous application entitled "Positive Variable Speed Transmission," U.S. Pat. No. 2,920,506, that issued Jan. 12, 1960, a transmission is disclosed that includes certain elements common to the present invention. The primary purpose in devising the present transmission is to provide one in which the control of the valve members is more easily attained, and in a more positive manner than that disclosed and claimed in my previous application.

SUMMARY OF THE INVENTION

The present transmission includes a driving shaft, a number of planetary gears, a sun gear rigidly secured to the driving shaft, and a plurality of first shafts, with the planetary gears affixed to the first shafts and each of the plantary gears in toothed engagement with the sun gear. A housing is rotatably supported on the driving shaft, with the housing formed with at least one endless circular confined space therein that is filled with a first hydraulic fluid, and the housing rotatably supporting the first shafts in fixed relation relative to one another. Pump means are provided that are operatively associated with the first shafts for pumping the hydraulic fluid in the confined space when the first shafts are rotated. A driven shaft assembly is coaxially aligned with the driving shaft and occupies a fixed position relative thereto, with the driven shaft assembly including first gear means that are at all times in toothed engagement with the planetary gears. The ratio of rotation of the driven shaft assembly relative to the driving shaft is determined by the degree of actuation of the pumping means, with the driving shaft and driven shaft assembly being in a one to one ratio when there is no actuation of the pumping means.

The improvements for controlling the force required to actuate the pumping means to pump the first hydraulic means in the first confined space to regulate the ratio of rotation of the driven shaft assembly relative to the driving shaft includes a number of rotatable valve members disposed in circumferentially spaced locations in the first confined space, with the valve members capable of occupying fully open, fully closed and intermediate positions. A number of circumferentially spaced, parallel second shafts, are provided, with the second shafts rotatably supported in the housing. The rotatable valve members are rigidly secured to the second shafts. Second means are provided that rotate concurrently with the housing and are so operatively associated with the second shafts that the valve members can be rotated between the fully open and fully closed positions to cause the driven shaft assembly to rotate at a desired speed ration relative to the rotation of the driving shaft. The second means may be manually controlled, or centrifically controlled to be responsive to the rate of rotation of the housing.

BRIEF DESCRIPTION OF THE DRAWINGS

FIG. 1 is a side elevational view of the variable speed transmission;

FIG. 2 is a schematic diagram of a hydraulic system that may be used to control the transmission;

FIG. 3 is a longitudinal cross sectional view of a first form of the transmission;

DESCRIPTION OF THE PREFERRED EMBODIMENT

Figure 5:
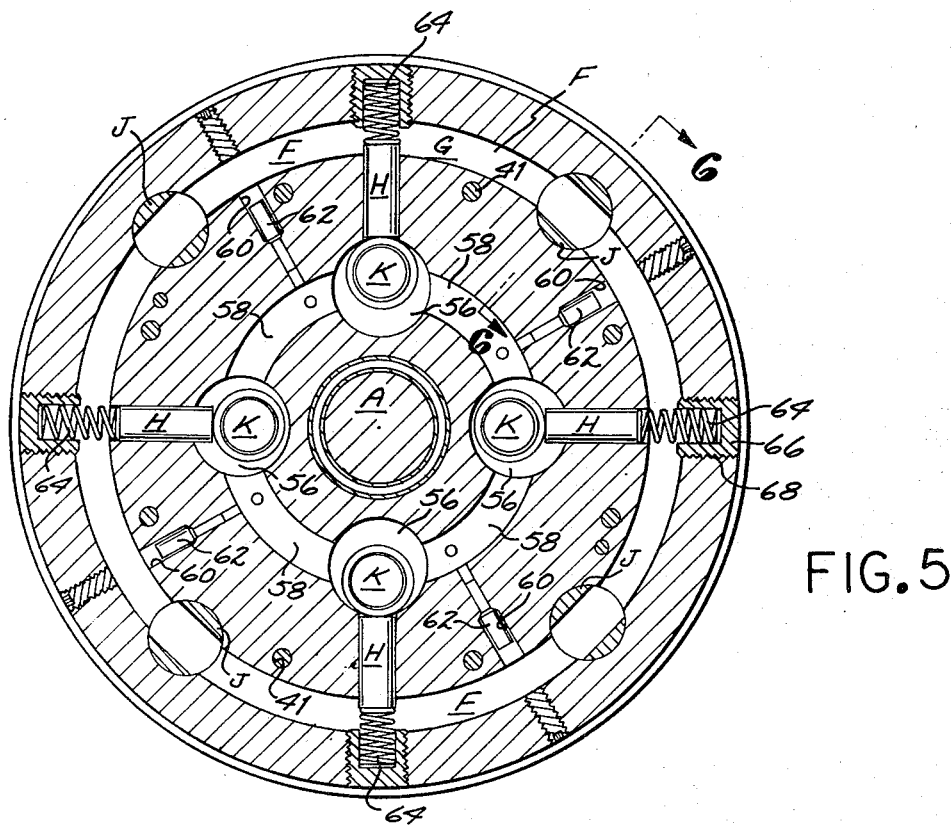
FIG. 5 is a second transverse cross sectional view of the transmission shown in FIG. 3 taken on the line 5—5 thereof.

In FIGS. 1 and 3 it will be seen that the first form of the transmission includes a driving shaft A that has a longitudinally extending fluid passage B formed therein that extends from a first port C to a second port D. A housing E, which will later be described in structural detail is rotatably supported on the driving shaft A, with the housing having a first circular confined space F formed therein, in which a first hydraulic fluid G is contained, as best seen in FIG. 5.

A number of circumferentially spaced, diametrically aligned pistons H are slidably mounted within the confines of housing E, with these pistons when reciprocated relative to confined space F pumping the hydraulic G situated therein backwardly and forwardly. Reciprocal movement of the pistons H is obtained by rotation of cams K best seen in FIGS. 3 and 5.

The cams K are rigidly affixed to ends of a number of shafts L which are parallel to the driving shaft A and are rotatably supported in the housing E. Shafts L have planetary gears M rigidly secured thereto. A sun gear N is rigidly mounted on driving shaft A and is transversely aligned with the planetary gears M, and is at all times in toothed engagement therewith.

A driven shaft assembly O is rotatably supported from an end portion of driving shaft a. Driven shaft assembly O includes a ring gear P, which gear is at all times in toothed engagement with the planetary gears M. A number of rotatable valve members J best seen in FIG. 5 are rotatably supported by second shaft R, as can best be seen in FIG. 6. The second shafts R, as shown in FIG. 7, have first gears Q keyed thereto. The first gears Q, as shown in FIG. 7, are in toothed engagement with a gear wheel S.

A pair of hydraulic cylinders T are supported from the end 10 of first housing E by a number of lugs 12. The lugs 12 are secured to the housing E by bolts 14 or other suitable fastening means. Each hydraluic cylinder T has a piston 16 slidably mounted therein that is connected to a piston rod 18. The piston rods 18 engage recesses 20 formed in the gear wheel S as shown in FIG. 7.

A second housing U that defines a second confined space 22 therein rotatably and sealingly engages the driving shaft A as shown in FIG. 3. The second housing U is held in a non-rotatable position relative to the driving shaft A by a fixed structure 21. The second housing U has a port 24 defined therein that is connected to a conduit 26, as shown in FIG. 2, through which a second hydraulic fluid V is delivered to the confined space 22. Pressure is applied to the second hydraulic fluid V in the confined space 22 by use of the apparatus W shown in FIG. 2 that later will be described in detail.

The second housing U is conveniently formed from two cup shaped members 28 and 30, the open ends of which are in abutting contact, with the second member 30 being removably secured to the first member 28 by a number of screws 32 or other fastening means, as shown in FIG. 3. The first and second members 28 and 30 as may be seen in FIG. 3, support conventional roller bearing assemblies 28a and 30a, as well as sealing assemblies 28b and 30b that are in sealing contact with the driving shaft A. The sealing members 28b and 30b cooperate with the members 28 and 30 to maintain the second confined space 22 in a fluid-tight condition. The housing U is held in a fixed longitudinal position relative to the driving shaft A by a spacer 34 and collar 36, as shown in FIG. 3.

The first housing E is preferably formed from two cylindrical rigid bodies 38 and 40 that are removably held together by a number of screws 41 that are shown in FIG. 5. The first and second bodies 38 and 40, at the central portion thereof adjacent their abutting faces cooperatively define a third confined space 42 through which the driving shaft A extends. The third confined space 42 has bearing assemblies 44 situated therein in longitudinally spaced relationship, with the bearing assemblies rotatably engaging the driving shaft A. A pair of sealing assemblies 46 are situated within the third confined space 42 and are in sealing engagement with the driving shaft A on opposite sides of the second port D.

The second housing member 40 has two diametrically opposed passages 48 formed therein that are in communication with the third confined space 42, as may be seen in FIG. 3. The outer ends of the first passages 48 are closed by plugs 50. The second passages 52 that intersect the first passages 48, with the second passages 52 terminating and communicating with the interior confined spaces 54 of the pistons T as shown in FIG. 7. The ports C and D, as may best be seen in FIG. 3, are at all times in communication with the second confined space 22 and third confined space 42, with the interior 54 of the hydraulic cylinders T at all times having second hydraulic fluid V supplied thereto through the line 26 due to the interconnection of the second confined space 22 to port C and third confined space 42 to the first and second passages 48 and 52.

The first and second housing members 38 and 40 cooperatively define a number of circumferentially spaced fourth confined spaces 56 in which the cams K rotate as shown in FIGS. 3 and 5, with these four confined spaces being connected to one another by arcuate passages 58, best seen in FIG. 5. The arcuate passages 57, by a number of circumferentially spaced, radially extending bores 60 are connected to the first confined space F. The first confined space F, bores 60, arcuate passages 58, and fourth confined spaces 56 are filled with the first hydraulic fluid G.

A number of members 62 are slidably mounted in the bores 60 to permit the pressure on the first hydraulic fluid G in the fourth confined spaces 56 and arcuate passages 58 to be at substantially the same pressure as the first hydraulic G in the first confined space F. The cams K, as may best be seen in FIG. 5, are arranged in diametrically opposed pairs, with the cam K in one pair being 180° out of phase when rotated to the cams in the other pair, with the result that as one diametrically opposed pair of pistons H is moving outwardly, the other pair of pistons is moving inwardly. By this arrangement, as the cams K rotate, the pistons H pump the first hydraulic fluid G in the first confined space F first in one direction and then in the other.

The pistons H, as may be seen in FIg. 5, are at all times urged inwardly by a number of circumferentially spaced compressed helical springs 64 that have first ends thereof in contact with the outer ends of the pistons H, and with second ends of the springs being in abutting contact with interior surfaces of a number of plugs 66 that engage tapped bores 68 formed in the first housing body 38, as can be seen in FIG. 3 and 5.

Each of the first shafts L, as can be seen in FIG. 3, is rotatably supported by two longitudinally spaced roller bearing assemblies 70 and 72. Each of the first shafts L intermediate the roller bearing assemblies 70 and 72 is rotatably engaged by a sealing assembly 74. The first housing body 38, as shown in FIG. 3, supports a roller bearing assembly 76 that rotatably engages the driving shaft A.

The driven shaft assembly O, as shown in FIG. 3, includes a driven shaft 78 that by a key 80 is removably secured to a first hub 82, which hub by bolts 84 is secured to a second hub 86. The second hub 86 develops into an upwardly extending circular plate 0 that on the periphery extends outwardly to define a circular flange 90 in which the ring gear P is mounted. The ring gear P is secured to the flange 90 by a number of bolts 92, or other suitable fastening means. The second hub 86 is rotatably supported on the driving shaft A by a pair of longitudinally spaced roller bearing asemblies 93 and 95. An inner race 94 of a roller bearing assembly 96 extends about the first and second hubs 82 and 86. Bearing assembly 96 includes an outer race 98 that is supported in a structure 100 that occupies a fixed position relative to the transmission shown in FIG. 3. Sealing means 102 of conventional design prevent entry of dust or dirt into the confines of roller bearing assembly to contaminate the roller bearings 104 that form a part thereof.

When the transmission previously described is installed on an automobile (not shown) having power steering, the apparatus W shown in FIG. 2 will include a first reservoir 106 for the second hydraulic fluid G and a second reservoir 108 for a third hydraulic fluid X. A conduit 110 extends from first reservoir 106 to a check valve 111 which check valve is connected by conduit 26 and a second conduit 112 to a first side of an idling valve 114. Idling valve 114 has a deformable diaphragm 116 therein that divides the interior of the valve into first and second compartments 114a and 114b that can vary in volume as the diagram deforms. Conduit 112 is in communication with first compartment 114a.

A four-way spring-loaded solenoid operated valve 118 is provided that is by first and second electrical conductors 120 and 122 connected to one terminal of a source of electric power 124 and to one terminal of an accelerator pedal switch 126. The switch 126 is closed when the accelerator pedal 128 is depressed. The other terminal of source of electric power 124 is connected by an electrical conductor 130 to pedal 128 which is electrically conductive. A power steering pump 132 is driven by the engine (not shown) of the automobile. The suction side of pump 132 is connected to a suction conduit 134 that is in communication with second reservoir 108. Third hydraulic fluid X discharges from pump 132 through a third conduit 136 to valve 118, and from the valve through a fourth conduit 138 when valve 118 is not electrically energized. Conduit 138 is connected to suction line 134 to permit continuous operation of pump 132.

A fifth conduit 140 and sixth conduit 142 are connected to valve 118 and are in communication when the valve is not electrically energized. Fifth conduit 140 is in communication with second comparment 146b and sixth conduit extends to suction conduit 136.

When the switch 126 is closed and valve 118 electrically energized, communication through the valve between third and fourth conduits 136 and 138 is obstructed. Third hydraulic fluid X then flows through fifth conduit 140 to second compartment 114b to increase the volume thereof by deformation of diaphragm 116, with surplus hydraulic fluid flowing from the valve 118 to return to suction conduit 134.

Increase in volume of second compartment 114b results in a decrease in volume of first compartment 114a. This decrease in volume of first compartment 114a results in first hydraulic fluid G being forced under pressure to the confined space 54 in hydraulic cylinders T, with resultant pivoting of the valve members J to positions that tend to restrain the reciprocation of pistons H. The greater the restraint on the reciprocation of the pistons H, which pistons are shown in FIG. 5, the greater will be the torque transmitted from driving shaft A to driven shaft 78.

Figure 13:
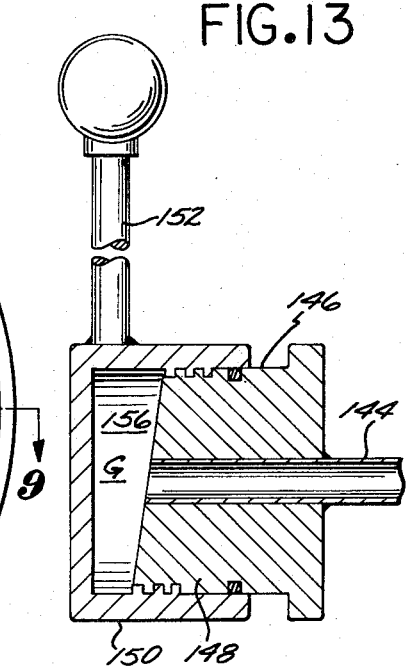
FIG. 13 is a combined side elevational and vertical cross sectional view of a manually operated transmission control valve that forms a part of the assembly shown in FIG. 2.

Conduit 26 is connected by a seventh conduit 144 to a transmission control valve 146, that is shown in structural detail in FIG. 13. Valve 146 includes an externally threaded cylindrical body 148 that is engaged by an internally threaded cup-shaped member 150 that may be rotated by a handle 152. Body 148 and member 150 cooperatively define a confined space 156 of variable volume that is in communication with conduit 144 and filled with second hydraulic fluid G. By rotation of member 150, the volume of confined space 154 may be varied to increase or decrease the pressure on second hydraulic fluid G with resultant rotation of the valve members J. By such increase or decrease in pressure on second hydraulic fluid G, the position of the rotatable valve members J shown in FIG. 5 are controlled, and the speed at which driven shaft 78 rotates relative to driving shaft A determined. When it is desired to terminate rotation of driven shaft 78, the accelerator pedal 128 is allowed to rise, due to a spring of conventional design that is not shown, to a position to open switch 126. The spring-loaded valve 118 then returns to a first position, with the resilient diaphragm 116 returning to its first position and decreasing the volume of the second confined space 114b. As the second confined space 114b decreases in volume, surplus third hydraulic fluid X therein is forced through valve 118 to conduit 142.

A number of compressed helical springs 156 extend between lugs 12 and gear wheel S, as best seen in FIG. 7, and at all times tend to pivot the gear wheels to a position where the interior spaces 54 in cylinders T are of minimum volume and valve members J are in the open position. As decrease in the volume of interior spaces 54 takes place, second hydraulic fluid G therein is displaced therefrom and flows to the first compartment 114a that has increased in volume.

From the above description it will be seen that the transmission illustrated in FIGS. 1 to 7 inclusive is actuated when the accelerator pedal 128 is depressed, and with the relative rate of rotation of the driven shaft 78 to the driving shaft A being controlled by manual manipulation of the valve 146.

Figure 4:
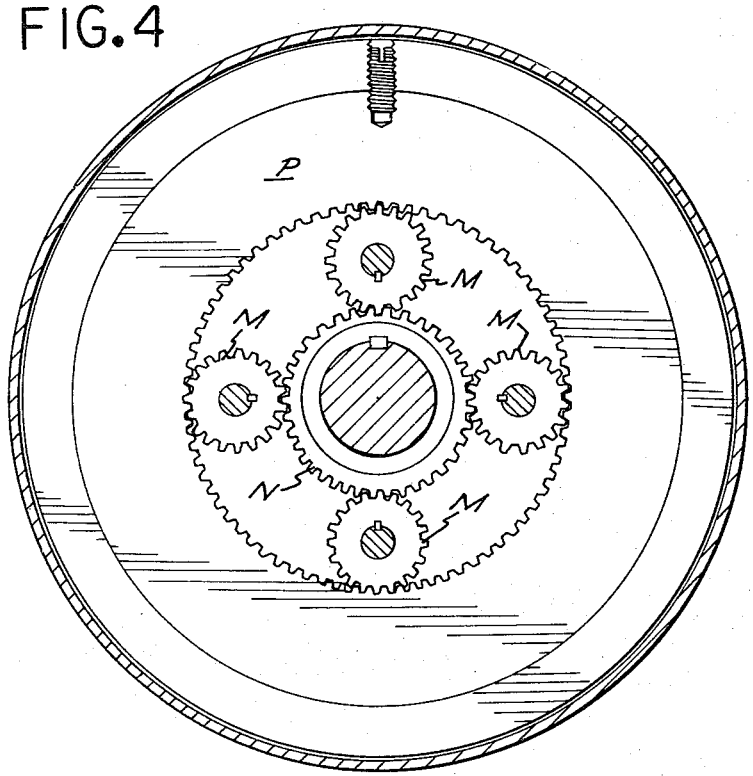
FIG. 4 is a first transverse cross sectional view of the transmission shown in FIG. 3 taken on the line 4—4 thereof.
Figure 6:
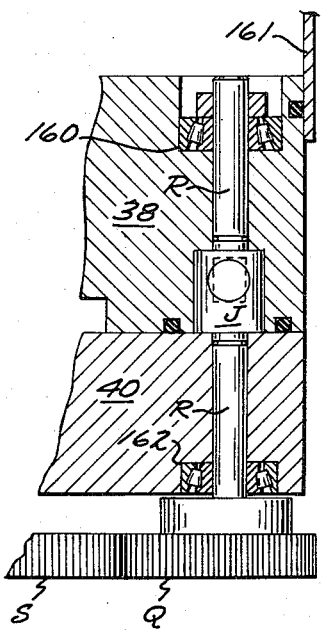
FIG. 6 is a fragmentary cross sectional view of the transmission taken on the line 6—6 of FIG. 5.
Figure 7:
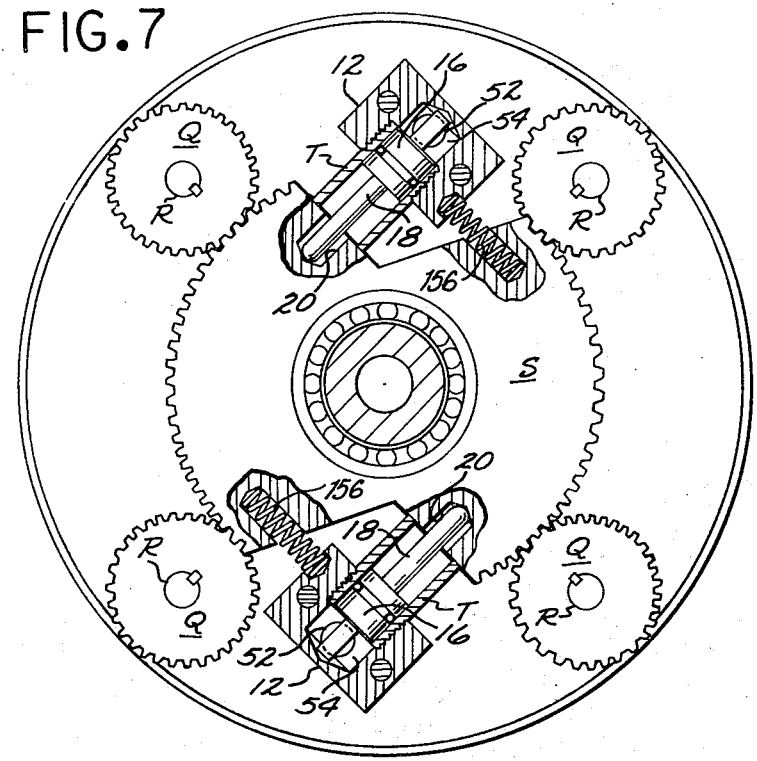
FIG. 7 is an end elevational view of the transmission shown in FIG. 3 taken on the line 7—7 thereof.

In FIG. 6 it will be seen that each of the second shafts R are rotated in roller bearing assemblies 160 and 162 mounted in the first and second housing bodies 38 and 40 respectively. Although the rotatable supports for the second shafts R are illustrated as roller bearing assemblies it will be apparent that ball bearing assemblies or other forms of bearings may be used if desired. Such alternate forms of bearings may of course be substituted if desired for other roller bearing assemblies described in conjunction with the invention. Should it be desired the transmission illustrated in FIG. 3 may have a dust cover assembly 161 removably and sealingly supported on the second hub 86 and first housing body 38. First, second and third resilient sealing rings 164, 166 and 168 of different diameters are disposed at the interfaces of housing bodies 38 and 40.

A second form of the transmission Y is shown in FIGS. 8 to 11 inclusive. Elements of transmission Y that are common to the first form Z of the transmission illustrated in FIGS. 1 to 7 inclusive, are identified by the same numerals and letters previously used, but with primes being added thereto.

Figure 8:
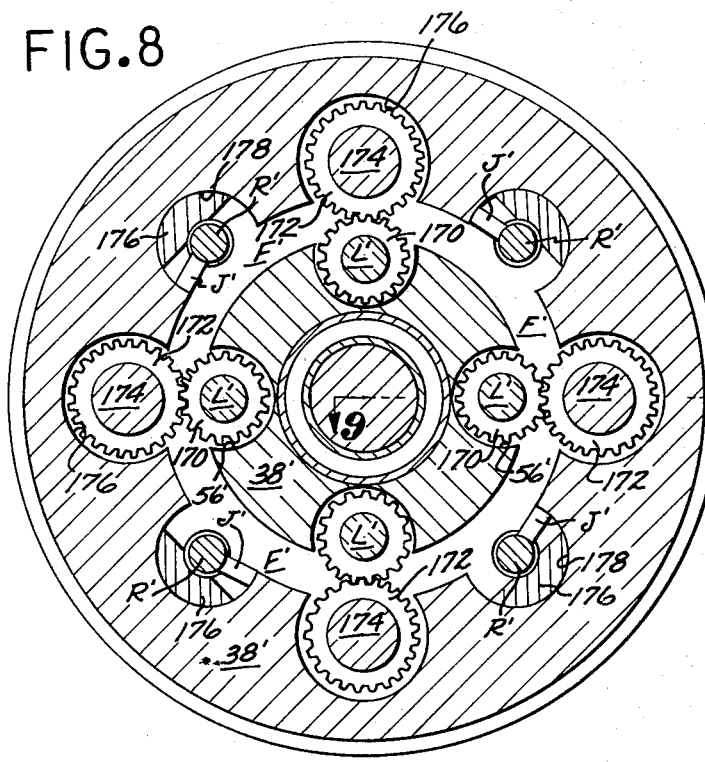
FIG. 8 is a transverse cross sectional view of a second form of the transmission.

In FIG. 8 it will be seen that the first confined space F' is in communication with fourth confined spaces 56', and each confined space 56' having a gear 170 disposed therein that is supported from a first shaft L'. The gears 170 replace cams K. The gears 170 are in toothed engagement with gears 172 that are secured to shafts 174 that are journalled in bearing assemblies (not shown) supported by housing bodies 38 and 40. Gears 172 are situated in confined spaces 176 that are in communication with first confined space F'.

The shafts R' rigidly support valve members J' that are in the form of blades that may be pivoted into the first confined space F' to a desired degree to restrain the flow of first hydraulic fluid G therein. When gears 170 are rotated, they rotate the gears 174, with each set of gears 170 and 174 acting as a pump to pump the first hydraulic fluid G' in first confined space F'. The degree of rotation of valve member J' is limited by semi-cylindrical stops 176 disposed in confined spaces 178.

Figure 10:
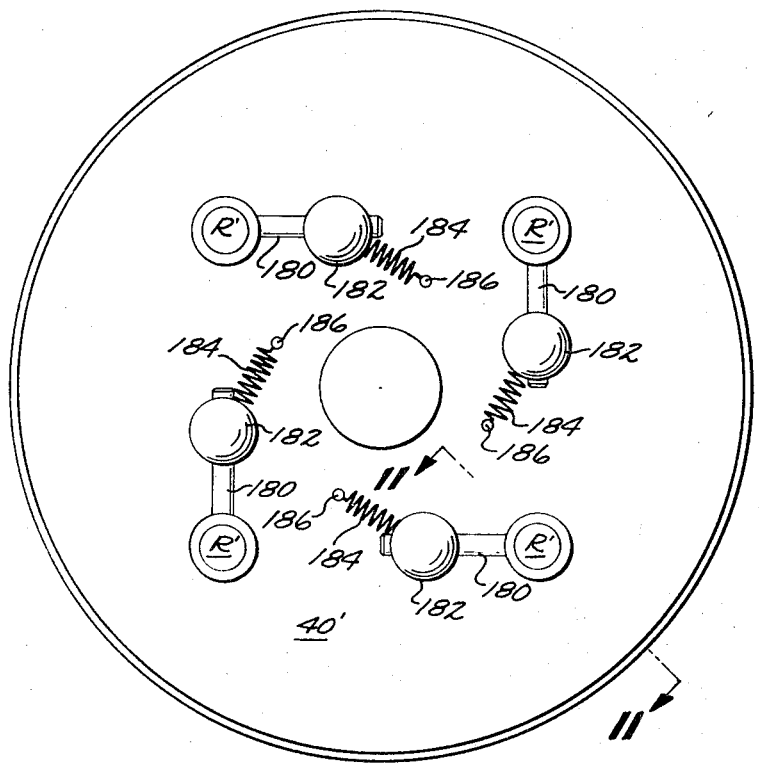
FIG. 10 is an end elevational view of a third form of the transmission.
Figure 9:
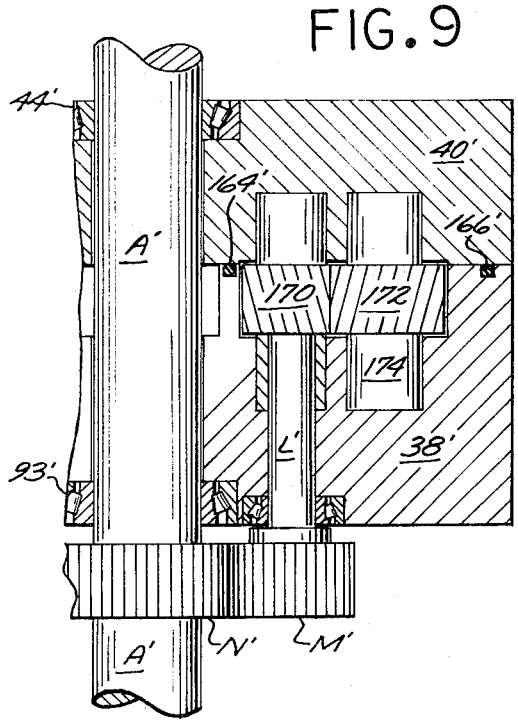
FIG. 9 is a fragmentary longitudinal cross sectional view of the second form of the transmission taken on the line 9—9 of FIG. 8.
Figure 11:
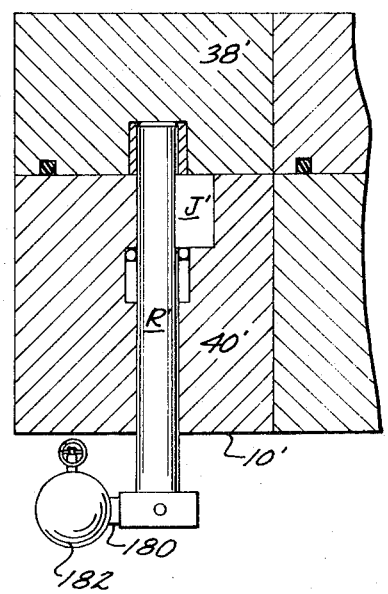
FIG. 11 is a fragmentary cross sectional view of a valve that may be employed in the third form of transmission and taken on the line 11—11 of FIG. 10.

Each shaft R' supports a rigid outwardly extending arm 180 that supports a weight 182 on the outer end thereof. Each of the weights 182 has one end of a taut helical spring 184 secured thereto, with the other end of the spring by fastening means 186 being secured to the housing E' as shown in FIG. 10.

When driving shaft A is stationary or rotating at idling speed, the tension on the springs 184 is sufficient to maintain valve members in the position shown in FIG. 8. As the rate of rotation of driving shaft A is increased above the idling speed, the rate of rotation of housing E' increases with the weights 182 and arms 180 pivoting outwardly due to centrifugal force to likewise pivot the second shafts R'. Pivotal movement of second shafts R' results in valve members J' moving to positions to restrain the flow of pumped first hydraulic fluid G' in first confined space F'. This restraint on the flow of first hydraulic fluid G' in first confined space F' results in torque at a desired rate of rotation of driving shaft A' being transferred to the driven shaft assembly O. In the second form Y of the transmission the control apparatus W is not required.

Figure 12:
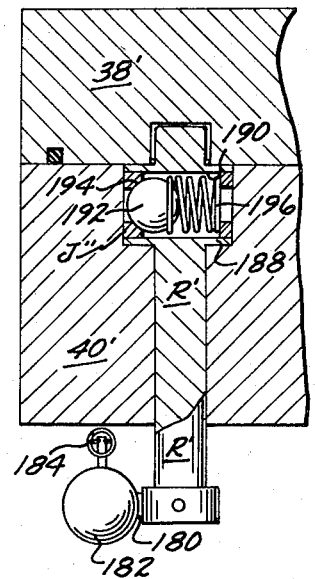
FIG. 12 is an alternate form of valve structure that may be used in lieu of the valve structures shown in FIG. 11.

In FIG. 12 a second shaft R' is shown as supporting an alternate form of valve member J'' that includes a cylindrical body 188 that has a transverse bore 190 therein that supports a rigid ball 192 that is removably held on a seat 194 in a sealing position by a compressed helical spring 196. The spring loaded ball 192 restrains flow of second hydraulic fluid G' until the pressure on the hydraulic fluid has built up to the extent the ball is displaced from the seat, with pivotal movement of the valve member thereafter controlling the restraint imposed on the second hydraulic fluid G''.

The use and operation of the invention has been described previously in detail and need not be repeated.

It will be apparent from the provisions described that if rotation of the housing E is lateral the direction of drive of the shaft 78 may be reversed.

I claim:

1. In a transmission of the type that includes: a driving shaft; a plurality of planetary gears; a sun gear rigidly secured to said driving shaft; a plurality of first shafts having first and second ends, with said planetary gears affixed to said first ends, and each of said planetary gears in toothed engagement with said sungear; a housing rotatably supported on said driving shaft, said housing formed with at least one endless circular confined space therein that is filled with a first hydraulic fluid, and said housing rotatably supporting said first shafts in fixed relationship relative thereto; pump means operatively associated with said second ends of said shafts for pumping said hydraulic fluid in said confined space when said shafts are rotated; a driven shaft assembly coaxially aligned with said driving shaft and occupying a fixed position relative thereto, said driven shaft assembly including first gear means that are at all times in toothed engagement with said planetary gears, with the degree of rotation of said driven shaft asembly relative to said driving shaft being determined by the degree of actuation of said pumping means, said driving shaft and driven shaft assembly being in a one to one ratio when there is no actuation of said pumping means; the improvement for controlling the force required to actuate said pumping means to pump said first hydraulic fluid in said first confined space to regulate the degree of rotation of said driven shaft assembly relative to said driving shaft, said improvement comprising:

a. a plurality of rotatable valve members disposed in circumferentially spaced locations in said first confined space, said valve members capable of occupying fully open, fully closed and positions intermediate therebetween;
   b. a plurality of circumferentially spaced parallel second shafts having first and second ends, said second shafts rotatably supported in said housing, and said valve members secured to said first ends of said second shafts; and
   c. second means that rotate concurrently with said housing and are so operatively associated with said second ends of said first shafts that said valve members can be rotated between said fully open and fully closed positions to cause said driven shaft assembly to rotate at a desired speed ratio relative to the speed of rotation of said driving shaft.

2. A transmission as defined in claim 1 in which each of said valve members is a rigid cylindrical body and has a transverse bore extending therethrough that is aligned with said first confined space when said valve member is in a fully open position, and said bore being completely blocked from communication with said first confined space when said valve member is in a fully closed position.

3. A transmission as defined in claim 2 in which the transverse diameter of said body is substantially greater than the transverse diameter of said first confined space, and said transverse bore is of substantially the same cross sectional area as that of said first confined space.

4. A transmission as defined in claim 1 in which said second means are centrifugally actuated and tend to rotate said valve members from fully open towards fully closed positions as the rate of rotation of said housing increases.

5. A transmission as defined in claim 1 in which said second means includes:
   d. a plurality of rigid arms that extend outwardly from said second ends of said first shafts and are normally disposed to said first shafts, said arms including first outwardly disposed ends;
   e. a plurality of weights rigidly secured to said first ends of said arms; and
   f. spring means that at all times tends to maintain said first shafts in first positions where said valve members are in said fully open position, but said spring means allowing said weights to rotate said first shafts by centrifugal force exerted on said weights to positions where said valve members are in fully closed positions when said housing rotates at a sufficiently rapid rate to achieve this result.

6. A transmission as defined in claim 1 in which said second means includes:
   d. a plurality of first gears rigidly secured to said second ends of said first shafts;
   e. a gear wheel in toothed engagement with said first gears, said gear wheel rotating concurrently with said housing but being rotatable within a limited range relative to said housing;
   f. spring means that at all times tend to maintain said gear wheel in a first position where said valve members are in said fully open position;
   g. a hydraulic cylinder, piston and piston rod assembly, said hydraulic cylinder secured to said housing, and said piston rod operatively connected to said gear wheel;

h. a second stationary hollow housing that defines a second confined space through which said driving shaft extends;

i. sealing means on said second hollow that rotatably and sealingly engage said driving shaft to maintain said second confined space fluid tight;

j. a source of a second hydraulic fluid under pressure that is in communication with said second confined space;

k. a reservior for said second hydraulic fluid; and l. valve and conduit means for controlling the flow of said second hydraulic fluid from said source to said second confined space and from said second confined space to said reservoir, with said second hydraluic fluid when discharged into said second confined space flowing therefrom through a first passage in said driving shaft to a second passage in said housing that is in communication with the interior of said hydraulic cylinder to move said piston and piston rod to rotate said gear wheel to dispose said valve members in desired positions to increase the force required to actuate said pumping means and by so doing control the ratio of rotation of said driven shaft assembly relative to said driving shaft, and said valve means when positioned to remove pressure from said second hydraulic fluid in said second confined space allowing said spring means to rotate said gear wheel to said first position with concurrent discharge of second hydraulic fluid from said second confined space to said reservoir.

7. A transmission as defined in claim 6 in which said pumping means includes:

m. a plurality of circumferentially spaced, radially positioned second pistons slidably supported in said housing in communication with said first hydraulic fluid in said first confined space;

n. a plurality of cams rigidly secured to said second ends of said first shafts; and o. a plurality of compressed helical springs that maintain said second pistons in pressure contact with said cams, with said second pistons being reciprocated by rotation of said cams as said planetary gears rotate relative to said sum gears to pump said first hydraulic fluid forward and backward in said first confined space.

8. A transmission as defined in claim 6 in which said pumping means includes:

m. a plurality of circumferentially spaced first gears in communication with said first confined space, said first gears rigidly secured to said second ends of said first shafts;

n. a plurality of second circumferentially spaced second gears in communication with said first confined space and in toothed engagement with said first gears, with said first and second gears being driven to act as a plurality of pumps to pump said first hydraulic fliud in said first confined space when said planetary gears rotate relative to said sun gear.

9. A transmission as defined in claim 1 in which said valve members each include a blade that may be disposed to completely obstruct flow of said first hydraulic fluid in said first confined space relative thereto.

10. A transmission as defined in claim 2 which in addition includes:

d. a plurality of spring loaded balls in each of said bores that prevent flow of said first hydraulic fluid through said bores until a predetermined pressure has been exerted on said first hydraulic fluid.

11. A transmission as described in claim 1, whereby a restrictive action, applied by power means to the rotatable housing assembly, produces a reversing rotative action on the driven shaft assembly; with the reversing rotation proportionate directly to the degree of restrictive forces applied to the rotatable housing assembly and the revolutions per minute of the driving shaft.

* * * * *